United States Patent
Petersson et al.

(10) Patent No.: US 7,613,543 B2
(45) Date of Patent: Nov. 3, 2009

(54) ELECTRONIC DEMARCATING SYSTEM

(75) Inventors: Ulf Petersson, Tollered (SE); Bengt-Allan Bergvall, Jönköping (SE)

(73) Assignee: Aktiebolaget Electrolux, Stockholm (SE)

( * ) Notice: Subject to any disclaimer, the term of this patent is extended or adjusted under 35 U.S.C. 154(b) by 721 days.

(21) Appl. No.: 10/517,043

(22) PCT Filed: Jun. 3, 2003

(86) PCT No.: PCT/SE03/00916

§ 371 (c)(1),
(2), (4) Date: Jun. 15, 2005

(87) PCT Pub. No.: WO03/104908

PCT Pub. Date: Dec. 18, 2003

(65) Prior Publication Data

US 2005/0230166 A1 Oct. 20, 2005

(30) Foreign Application Priority Data

Jun. 7, 2002 (SE) .................................. 0201739

(51) Int. Cl.
*G06F 19/00* (2006.01)
(52) U.S. Cl. ............... 700/245; 700/253; 700/254; 700/255; 700/258; 700/262; 180/167; 180/168; 180/169; 318/568.12; 318/580; 318/581; 318/587; 701/50; 701/213; 367/88; 367/83; 379/88.22
(58) Field of Classification Search ........ 700/245, 700/253, 254, 255, 258, 262, 302; 180/167, 180/168, 169; 318/568.12, 580, 581, 587; 701/213, 50; 901/1; 707/1, 3, 5, 104.1; 367/88, 367/701; 369/44.27; 379/88.22
See application file for complete search history.

(56) References Cited

U.S. PATENT DOCUMENTS

| | | | |
|---|---|---|---|
| 4,470,013 A | | 9/1984 | Posseme |
| 5,652,489 A | * | 7/1997 | Kawakami ............... 318/587 |
| 5,940,346 A | | 8/1999 | Sadowsky et al. |
| 6,459,955 B1 | * | 10/2002 | Bartsch et al. .......... 700/245 |
| 6,615,108 B1 | * | 9/2003 | Peless et al. ............ 700/245 |

(Continued)

FOREIGN PATENT DOCUMENTS

WO 99/38056 7/1999

(Continued)

OTHER PUBLICATIONS

Schmitt, Pulse Dispersion in a Gyrotropic Plasma, 1965, IEEE, p. 834-942.*

*Primary Examiner*—Khoi Tran
*Assistant Examiner*—McDieunel Marc
(74) *Attorney, Agent, or Firm*—Pearne & Gordon LLP

(57) ABSTRACT

A method and an electronic search system for operating an automatic device, preferably an automatic lawnmower. The system comprises at least one first electrical cable (1,4,5,6) connected to at least one first signal generator (3,7,8) and at least one sensing system arranged on said device. Said sensing system detects at least one magnetic field being transmitted via said cable (1,4,5,6) and propagating through the air, the sensing system transmitting a processed signal to at least one driving element which contributes to the movements of said device in relation to a surface.

56 Claims, 9 Drawing Sheets

U.S. PATENT DOCUMENTS

| | | | |
|---|---|---|---|
| 6,885,912 B2 * | 4/2005 | Peless et al. | 700/245 |
| 7,155,309 B2 * | 12/2006 | Peless et al. | 700/245 |
| 7,174,238 B1 * | 2/2007 | Zweig | 700/245 |
| 7,248,951 B2 * | 7/2007 | Hulden | 701/23 |
| 7,349,759 B2 * | 3/2008 | Peless et al. | 700/245 |
| 2003/0144774 A1 * | 7/2003 | Trissel et al. | 701/23 |
| 2003/0208304 A1 * | 11/2003 | Peless et al. | 700/245 |
| 2004/0193339 A1 * | 9/2004 | Hulden | 701/23 |

FOREIGN PATENT DOCUMENTS

| | | |
|---|---|---|
| WO | 99/59042 | 11/1999 |

* cited by examiner

ELECTRONIC DEMARCATING SYSTEM

This application claims the benefit of International Application Number PCT/SE03/00916, which was published in English on Dec. 18, 2003.

TECHNICAL FIELD

The present invention relates to a method and an electronic search system for operating an automatic device, preferably an automatic lawnmower. The system comprises at least one first electrical cable connected to at least one first signal generator and at least one sensing system arranged on said device. Said sensing system detects at least one magnetic field being transmitted via said cable and propagating through the air, the sensing system transmitting a processed signal to at least one driving means which contributes to the movements of said device in relation to a surface.

BACKGROUND

The idea of developing working tools that can work automatically is old. Such tools are for instance robots for vacuum cleaning or to cut grass. Despite the fact that this is an old idea, such tools have not reached the consumer until recently. One example is the robotic vacuum cleaner Trilobite™ and the automatic lawnmower Automower™. Both of these treat (cut or clean) a surface by moving in relation to it within the area that should be treated.

In order to keep the robot within the area that should be treated search systems have been developed. These systems consist in at least one electrical cable together with a sensing system in the robot that detects signals transmitted by the cable. The cable/-s is for instance arranged in order to define a borderline which the robot is not allowed to pass so that it leaves the area it should treat. A robotic vacuum cleaner normally only uses such cables in door openings and at stairs since it normally works inside a room surrounded by walls. If the vacuum cleaner should operate in a very large room, cables dividing the room into different areas could be used. Robotic lawnmowers on the other hand do not work in areas defined by walls. Therefore, electrical cables defining the area or areas inside which the robot should operate are needed.

Such cables and also certain cables used with robotic vacuum cleaners can consist in permanent magnets or electrical cables through which an electric current may be transmitted.

The sensing system normally consist in at least one receiver unit that detects magnetic signals, a control unit connected to the receiver which process the received signals and a motor unit connected to the control unit which controls the movements of the robot. The system detects the variation in field intensity (the field being generated by the current or the permanent magnet) when the robot approaches the cable. The control unit processes the information and decides, depending on the function activated, to operate the movement of the robot by operating the motor unit. For instance, the system can prevent the robot from moving out from the area which it should treat or make it move along a cable.

A scarcity with present search systems for automatic robots is that they use an uninterrupted current (such as one or several sinus waves) in order to generate the magnetic signals. The magnetic fields that the current generates propagate in the whole area or parts of the area within which the robot intends to operate. If any other magnetic field, for instance generated by another electrical cable arranged near the area, propagates in the same area the sensing system will detect this field. Such disturbing field can confuse the sensing system and thereby cause operating problems for the robot. Especially signals from other similar search systems, such as the next-door neighbours' system, could cause such operating problems since both systems may operate within the same frequency band. The search systems will interfere with each other since the fields are added. Another problem with present search systems is that the costs for sinus wave systems has increased since these often requires trimming of the frequency defining components. The present invention has been developed in order to solve the above-mentioned problems.

SUMMARY OF THE PRESENT INVENTION

The present invention relates to a method and an electronic search system for operating an automatic device, preferably an automatic lawnmower. The system comprises at least one first electrical cable connected to at least one first signal generator and at least one sensing system arranged on said device. Said sensing system detects at least one magnetic field being transmitted via said cable and propagating through the air, the sensing system transmitting a processed signal to at least one driving means which contributes to the movements of said device in relation to a surface. Said signal generator of the present invention further transmits a current through said first cable, said current during a part of time being is in a state of rest were it is substantially constant, said state periodically being interrupted by at least one first characteristic current pulse.

DESCRIPTION OF DRAWINGS

The invention will be described in form of a preferred embodiment by making reference to the accompanying drawings, in which.

DESCRIPTION OF AN ILLUSTRATIVE EMBODIMENT

The figures show an illustrative embodiment of a search system according to the present invention. The illustrative embodiment should not be read as a restriction of the scope of the invention, since its purpose only is do illustrate one embodiment within the kind of search systems the present invention relates to. The purpose of the embodiment is to illustrate the scope of the invention.

Figure 1:
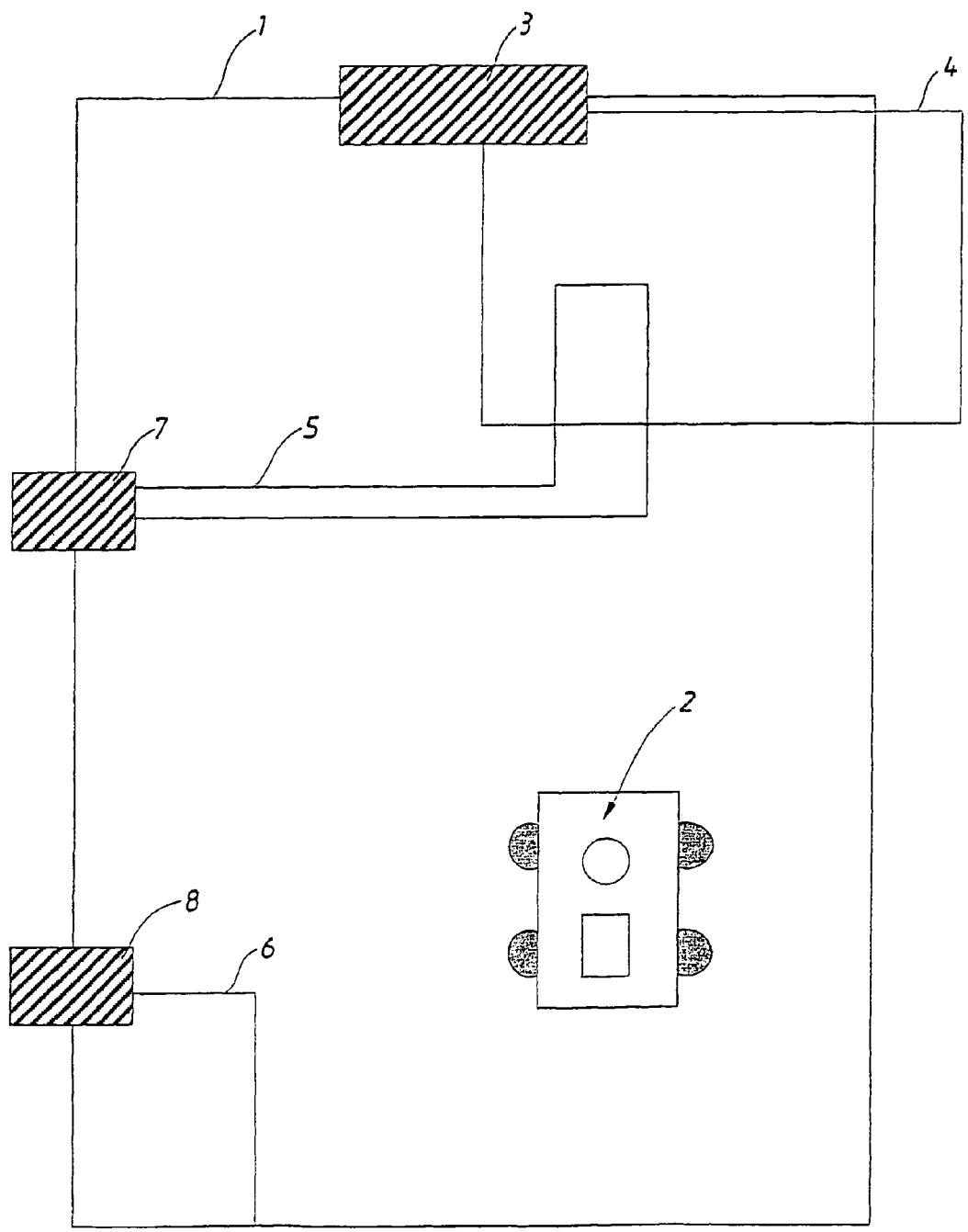
FIG. 1 shows a search system according to the present invention

In FIG. 1 a search system is shown. The system consists in an outer search cable 1 intended to enclose the area within which the robot 2 should move and operate. The outer cable comprises an electrical cable and a signal generator 3. The generator generates signals in the form of an electric current which is transmitted through said cable. The system of the illustrative embodiment moreover comprises three other search cables 4-6, which also consist in electrical cables. One of these 4 uses the same signal generator 3 but the others 5-6 each has one slave signal generator 7-8 each which generates the signal in the cable. The slave generators are connected to the outer cable 1 in order to synchronize to the signals of the generator 3 of the outer cable. One alternative is to synchronize the generators using another type of communication, for instance radio signals. The cables shown extend crossing each other in order to further show the benefit with the system according to the present invention.

Figure 3:
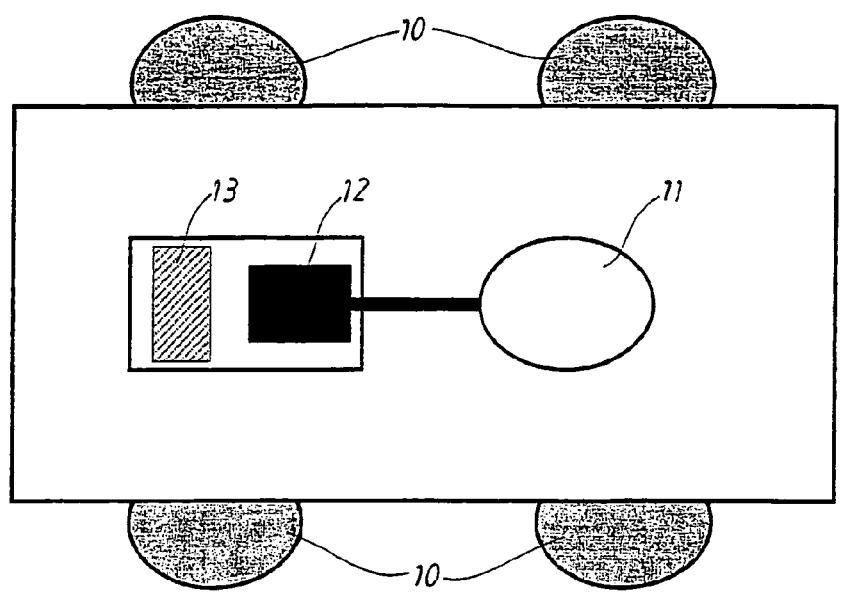
FIG. 3 shows an automatic device for the search system according FIG. 1.

In FIG. 3 the robot is shown. It comprises one sensing system 11,12,13 as part of the search system. Moreover, the robot has wheels 10. The sensing system of the illustrative embodiment, which normally consists in one common unit implemented into the robot, comprises means 11 (from now these means is defined as the receiver) for detecting a magnetic field, a control unit 12 processing the received magnetic field information, which is then connected to a motor unit 13. In FIG. 3 the receiver, the control unit and the motor unit are shown separated from each other in order to illustrative the different functions of said sensing system.

The figures show the units separated, but in modern systems at least some of them can be read as functions, since software normally is involved to achieve these functions. The software system, comprising a microcomputer, uses some extra components in order to fulfill its task. Such a component could be the receiver normally comprises one coil surrounding a ferrite rod. Magnetic fields actuate the receiver since the coil detects the fluctuations of the magnetic field and generates an electrical voltage at the coil. The control unit receives these generated electrical signals and processes it. Based on the processed information the sensing system, using the motor unit, operates the motors by which the wheels 10 are driven A control unit for this kind of robot of course also could have other tasks, such as controlling treating tools, such as cutting knives etc. mounted into the robot. In order to manage the processing, the control unit 12 uses memory units in which software data is stored. The most important task for the control in relation to the invention is of course the capability of receiving and processing signals transmitted from an electrical cable 1,4,5,6. Therefore, the different parts of the robot are in FIG. 3 only shown schematically. The treatment is further described in relation to the functions of the robot, see below.

Figure 4:
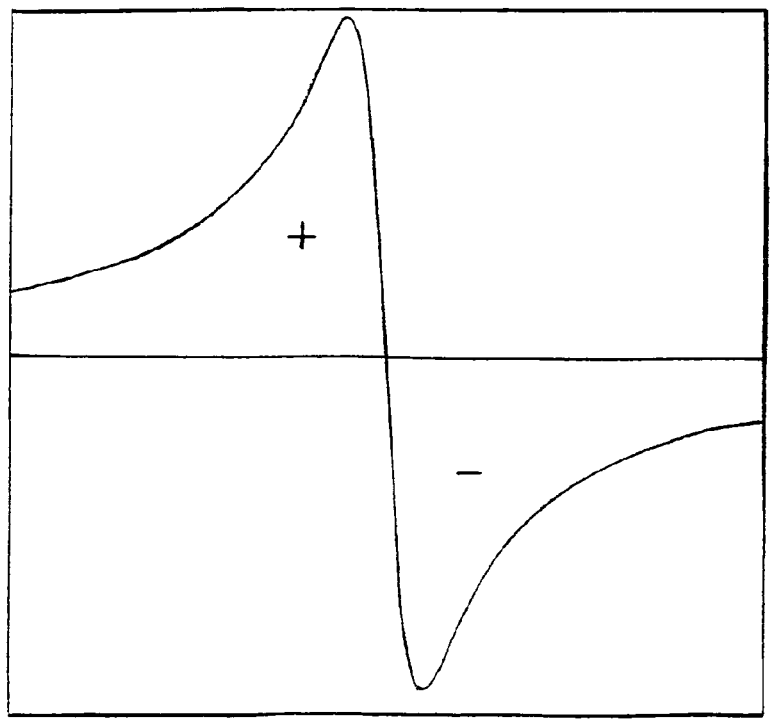
FIG. 4 shows an illustration of the magnetic fields for an electrical cable as part of the search system according to FIG. 1.
Figure 5:
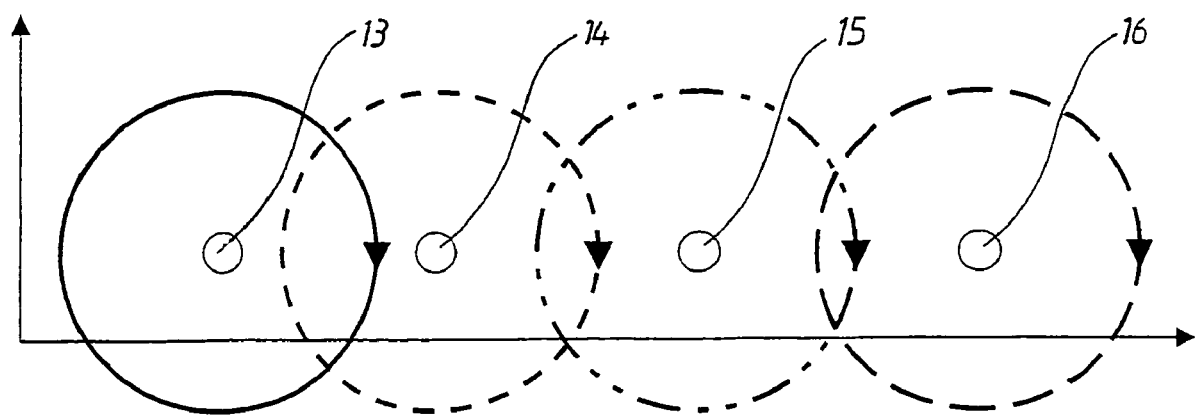
FIG. 5 shows an illustration of the magnetic field for different electrical cables as part of the search system according to FIG. 1.

In FIGS. 4 and 5 the field picture of the magnetic fields is shown, which fields are generated around the cable through which an electrical current is transmitted. The principal is that the switching current sent produces a magnetic field around the cable. The field intensity further decreases with the distance from the cable, see FIG. 4. In the figure the vertical field is shown in different points at a circular cable. Please notice that the steep slope in the middle part of the curve relates to the fact that the part of the magnetic field that the sensing system detects at one moment changes direction. This means that at a certain moment a magnetic field on one side of a cable is directed in an opposite direction in relation to a magnetic field on the other side of the cable. This means that the robot will detect a change in field direction when it moves in relation to the cable and crosses the cable. 1. This also means that the sensing unit 11,12,13, by which the robot detects the magnetic field, will recognize that the robot crosses a cable 1,4,5,6. In FIG. 4 a horizontal line is shown through which the middle part of the graph passes. This line illustrates the zero cross point and therefore also the change in the field direction. The line also indicates the position of the cable.

The search system 11,12,13 is capable of allowing the robot to partly cross the outer cable 1, thereby enabling the robot to operate at the surface just outside the cable. By allowing the receiver 11 to pass the cable and then count the wheel turns for instance using a wheel turn sensor (not shown), the robot can move a little distance outside the cable 1,4,5,6. Using the counting of wheel turns and/or magnetic field detection, the sensing system will be able to guide the robot back to the area inside which it should operate. The last movement is not shown in FIG. 8. Such a detection of the magnetic field used in order to guide the robot back means, as earlier disclosed, that the sensing system 11,12,13 detects when the magnetic field changes direction. Since the magnetic field on the opposite sides of the cable have an opposite direction, the sensing system can recognize if the robot crosses the cable and furthermore, if it has a reference signal, know on which side of the cable it is positioned. Thereby, the robot can be directed towards the wanted side of the cable. Of course this recognition and navigation can be achieved disregarding which of the disclosed cables 1,4,5,6 it navigates in relation to.

FIG. 5 shows a schematic view of four electrical cables 13-16. The current flows away from the reader of the view, which causes the magnetic field around the cable to have the direction shown in the figure. More details according to the figures will be described down below in relation to FIGS. 1 and 2.

Now referring to the figures, the functions of the cable 1,4,5,6 and the signal generators 3,7,8 shall be described. The principle is that the signal generator transmits an electrical current through each of the cable, respectively. The current generates a magnetic field around the cable, which is shown in FIG. 4-5. Since the electrical cable has inductive properties, a current pulse originated from a voltage pulse sent through the wire will be delayed. This means that it will take some time before the current corresponds to the definition of Ohms law, (I=U/R). The current pulse will have a rising curve with a substantially exponential shape and finally reach the value according to said law. This means that during the beginning of every new voltage pulse, the search system will at a first period not work as in regular electrical theories, such as Ohms law. This is also the situation during the end of a voltage pulse, in which the system again shows a certain delay. This is further illustrated in FIG. 10, which will described more in detail later on. The inductance of an electrical cable depends on its length, how it is positioned and the shape of the cable. Electrical cables positioned near each other actuates the inductance of each cable. The knowledge of how the inductance is actuated is important to keep in mind in order to understand how the search system works.

Figure 2:
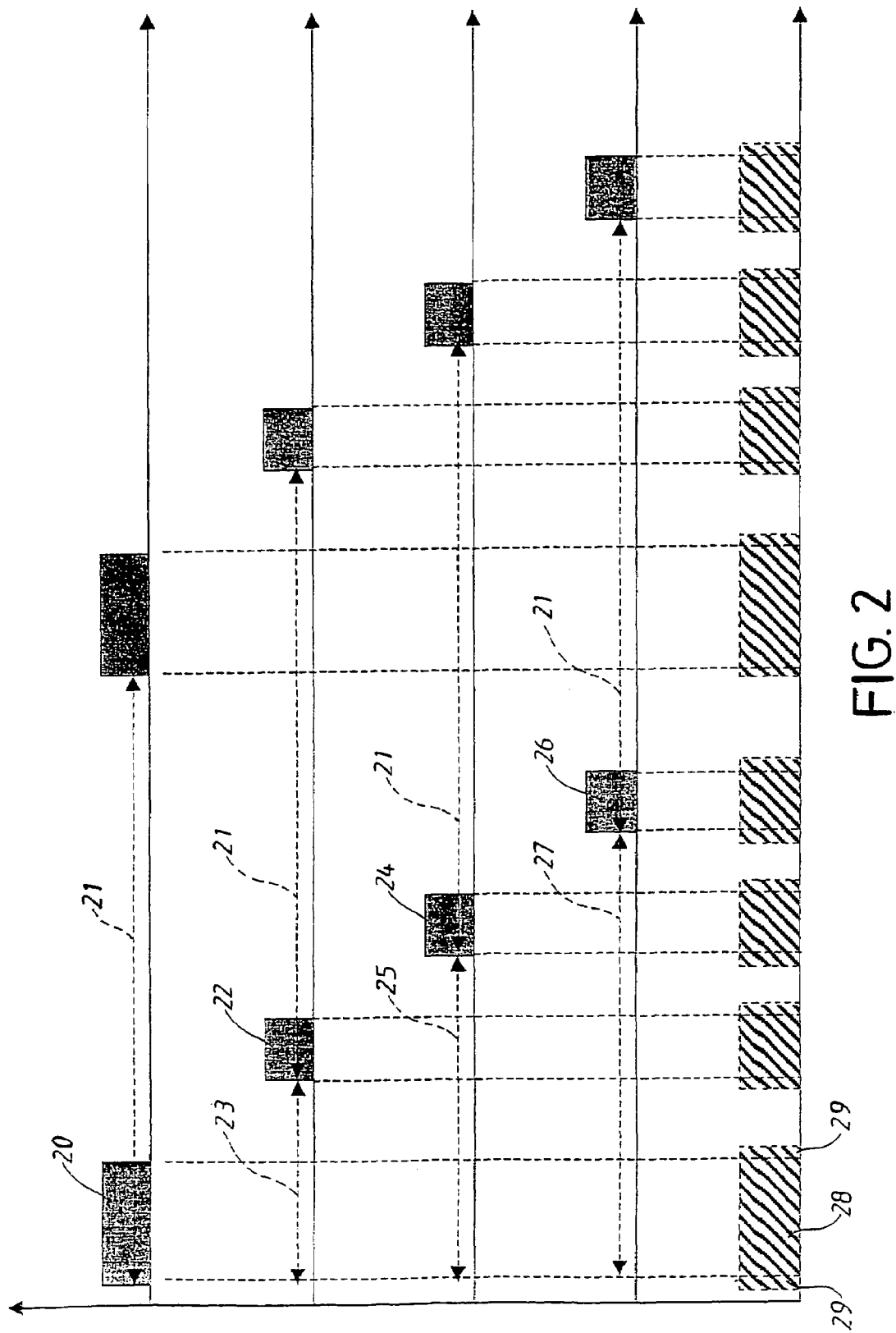
FIG. 2 shows a diagram of signals in the search system according to FIG. 1.

The search system operates by transmitting current pulses through the current cables 1,4,5,6 as parts of the present system. The pulses, see FIG. 2, has a length of 50 µs or 100 µs. The defined pulse lengths of the pulses should not been seen as a limitation of the scope of the invention. The mentioned lengths therefore only represent suitable values for the illustrative embodiment. Most essential is that the search system operates with characteristic current pulses between which the current is in a state of rest. A person skilled in the art will understand that the invention, as disclosed in the present application, also comprises the cases where the percentage relation between those time periods where a current pulse occurs and those periods where no pulse occurs can differ from what is illustrated in FIG. 2. The person skilled in the art also realizes that a system with only one cable, through which one signal is transmitted, also falls within the scope of the invention. Such a system would represent the simplest embodiment within the invention.

The current pulses are transmitted by the signal generators 3,7,8 using push-pull with a voltage between the poles of 40V. Push-pull means that the poles are switched during every current pulse, which causes the peak-to-peak value through the cable to become larger than if only one regular 40V pulse was used. The reason to use peak-to-peak is that the current intensity is important in order to generate a magnetic field which the receiver 11 can detect. In some countries search systems like the one illustrated here are not allowed to use a voltage of more than 40V. If the system has a high inductance there is a risk that the intensity of the magnetic field will become to low when a 50 µs pulse is used and therefore will not be detectable by the sensing system. Instead of increasing the length of the pulse, which would cause increased energy consumption and a risk of interfering magnetic fields from the same search system, push-pull could be used. In the illustrative embodiment the use of push-pull will result in a current intensity of 1-2 Ampere.

Figure 9:
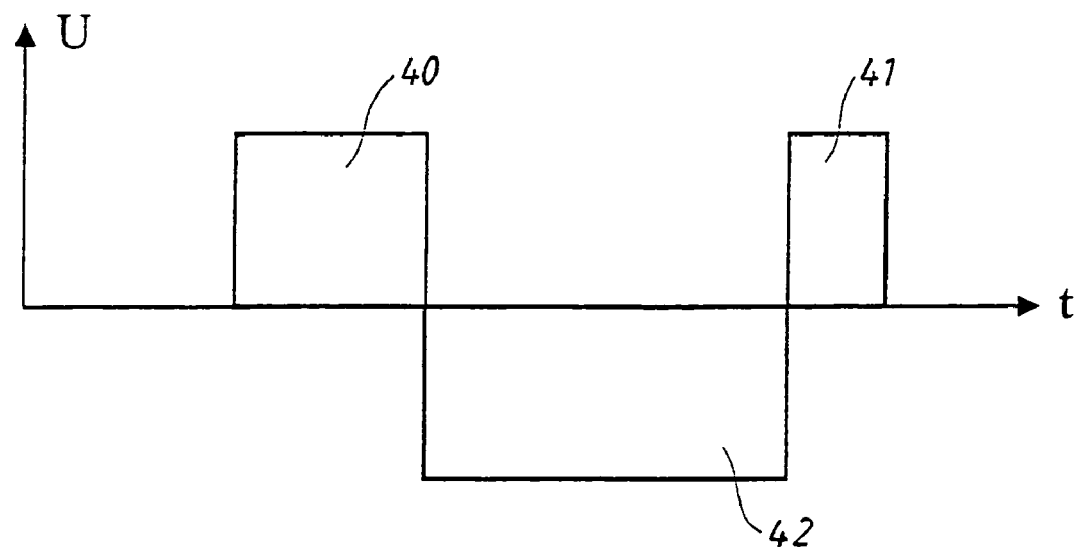
FIG. 9 shows push-pull in the search system according to FIG. 1.
Figure 9:
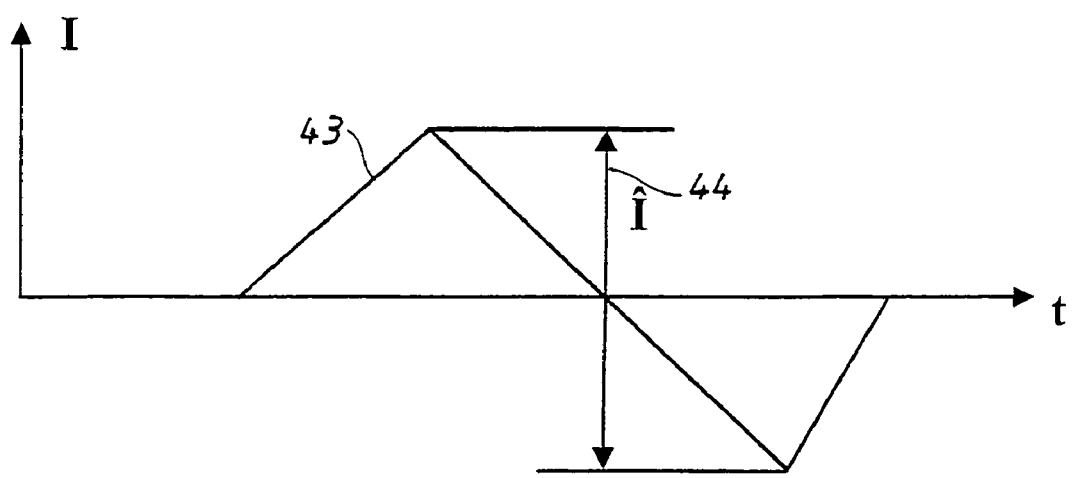

FIG. 9 shows the result of a push-pull. The total duration for the current pulses 40-42 corresponds with one current pulse in the search system. The first 40 and the last 41 voltage pulse in the upper diagram are transmitted out into the cable having the same polarity. Between said first and last voltage pulse the polarity is switched causing the middle voltage pulse 42 in the same upper diagram to be transmitted with a polarity switched in relation to the other pulses 40-41. The result of this operation is shown as a current pulse in the lowest diagram. The peak-to-peal value Î 44 in this operation is twice as large comparing its value if only one long pulse with one polarity were uses. The characteristics of the current pulse, with sloping parts, depend on the inductance of the cable.

In FIG. 2, shows a principle, the pulse 20 corresponds to a main pulse A0 with a length of 100 µs. The principle disclosed in the illustrative embodiment should not be read as a limitation of the scope of the invention. Other pulse lengths are also possible within the scope of the invention. The figure shows an idealized view of current pulses corresponding to the unrealistic situation that the cable did not have any inductance. Furthermore, the use of push-pull is not shown. The period 21 for this view and the illustrative embodiment of the present invention is 12 ms which corresponds with a frequency of 83 Hz. Between each main pulse there is also room for additional pulses. It is obvious for a person skilled in the art that search systems operating in another frequency that the one of the illustrated embodiment falls within the scope of the invention.

The pulse S1 22 in the figure has a length of 50 µs, the pulse having the same period as A0 and incides 1 ms after A0. The time 1 ms is selected because of the amplifier of the control unit 12, which needs to have time to restore themselves between the pulses. The time for restoration depends on the decay of the A0 pulse in the coupling capacitors of the amplifier. The current pulse S2 24 in the figure has the same length and period as S1 and incides 2 ms 25 after A0. There is finally also a pulse S3 36 in the figure which has the same length and period as S1 and S2 and incides 3 ms 27 after A0. The distance 1 ms is always selected depending on the decay of earlier current pulses. The pulses are generated by the signal generators 3,7,8 in which generator 3 generates both A0 and S1, while generator 7 generates S2 and generator 8 generates S3.

In FIG. 5 four cables 13-16 are shown, which corresponds to the cables 1, 4, 5, 6 of FIG. 1. Using FIGS. 2 and 5 and allowing cable 13 corresponding to cable 1 and so forth will cause the magnetic fields T0-T3 transmitted by the cables to correspond with the current pulses 20, 22, 24 and 26. T0-T3 thereby occurs on different pints of time and can be processed at different pints of time by the control unit 12 of the sensing system. The control unit thereby can evaluate the position of the receiving unit in relation to every single electrical cable transmitting a magnetic field. As earlier mentioned, this means that the control unit, based on the detection of the characteristics of the magnetic field over time, can recognize on which side of a cable 1,4,5,6 the robot is positioned. The present search system therefore has a major benefit in comparison with earlier search systems for instance using continuing sinus waves, where each electrical cable transmitting magnetic fields interfere with magnetic fields transmitted by other current cables.

Using current pulses is the scope of the present invention. Since the current pulse occurs during a short time interval, and since the sensing system only listens for magnetic field pulses during a time interval corresponding to the current pulse, the search system 11,12,13 will be able to sort out magnetic noise that may disturb the operation of the robot. Other essences are the creation of short, strong current pulses that dominates over the noise and consumes less energy.

By making the current pulses short in relation to the period, the search system will be less sensitive to disturbing magnetic noise from external sources. By designing the system so that disturbing noise only actuates the system for a short time interval per period the system will operate better. Since the search system is designed to keep its synchronization, unsynchronised disturbing noise will not be able to cause troubles for the system and vice verse.

Figure 6:
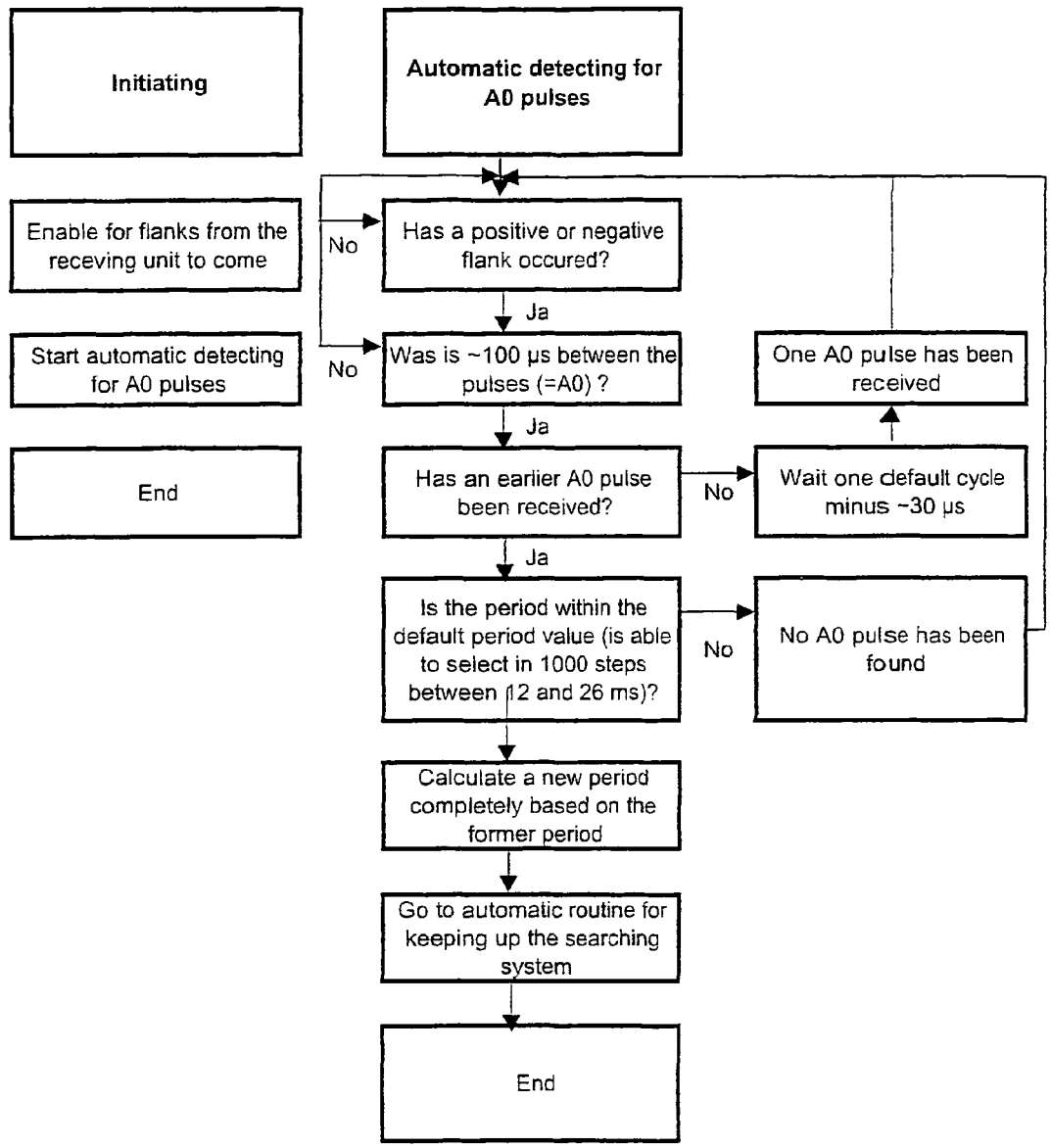
FIG. 6 shows a flowchart of an algorithm for the search system according to FIG. 1.
Figure 7:
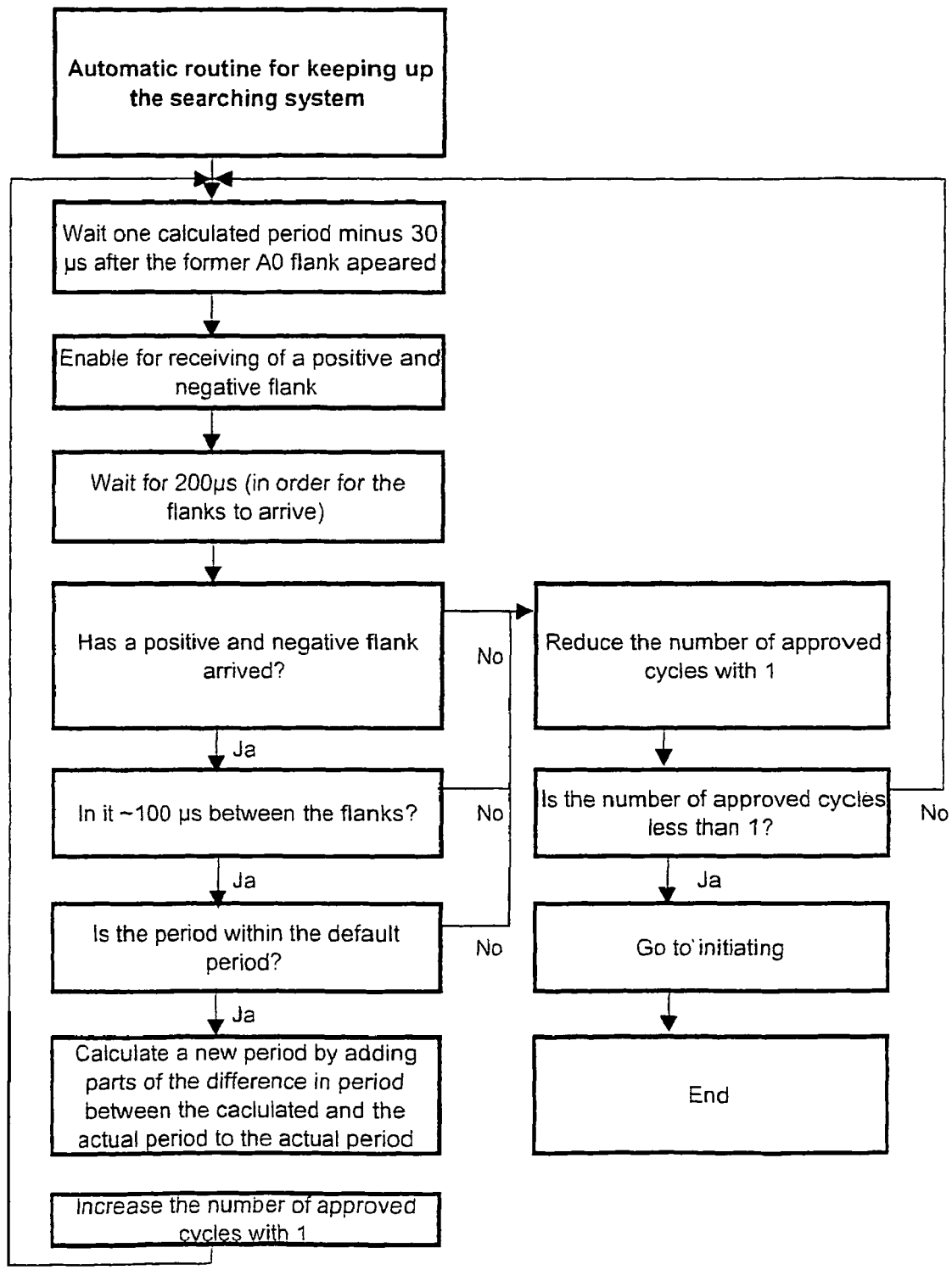
FIG. 7 shows another flowchart of an algorithm for the search system according to FIG. 1.

With relation to the figures, the operation of the sensing system will now be described. FIG. 6-7 shows flowcharts illustrating some of the algorithms from which the sensing unit operates. These relates to the process of the signals that the current pulses in the cables generates. The main purpose with the communication from the electrical cables 1, 4, 5, 6 to the sensing system 11,12,13 on the robot is to enable for the robot to control its movements in relation to the cables. These movements and other operational aspects will be described after the account of the algorithm. The signal generators 3,7,8 generate current pulses 20,22,24,26 in the electrical cables, which current pulses generates magnetic field pulses that are transmitted from the cables. The receiver 11 of the sensing system, which is being arranged on the robot 2, detects the magnetic field pulses. The pulses are detected if they exceed a certain threshold value. The threshold value gives one additional option for the sensing system to sort out signals sent out from external sources, which signals often have a lower intensity.

The coil of the receiver unit 11 generates an inductive voltage e, which has an instantaneous value being proportional to the time derivative $(d\phi/dt)$ of the detected magnetic field intensity. N corresponds to the number of coil turns:

$$e = -N * d\phi/dt$$

Figure 10:
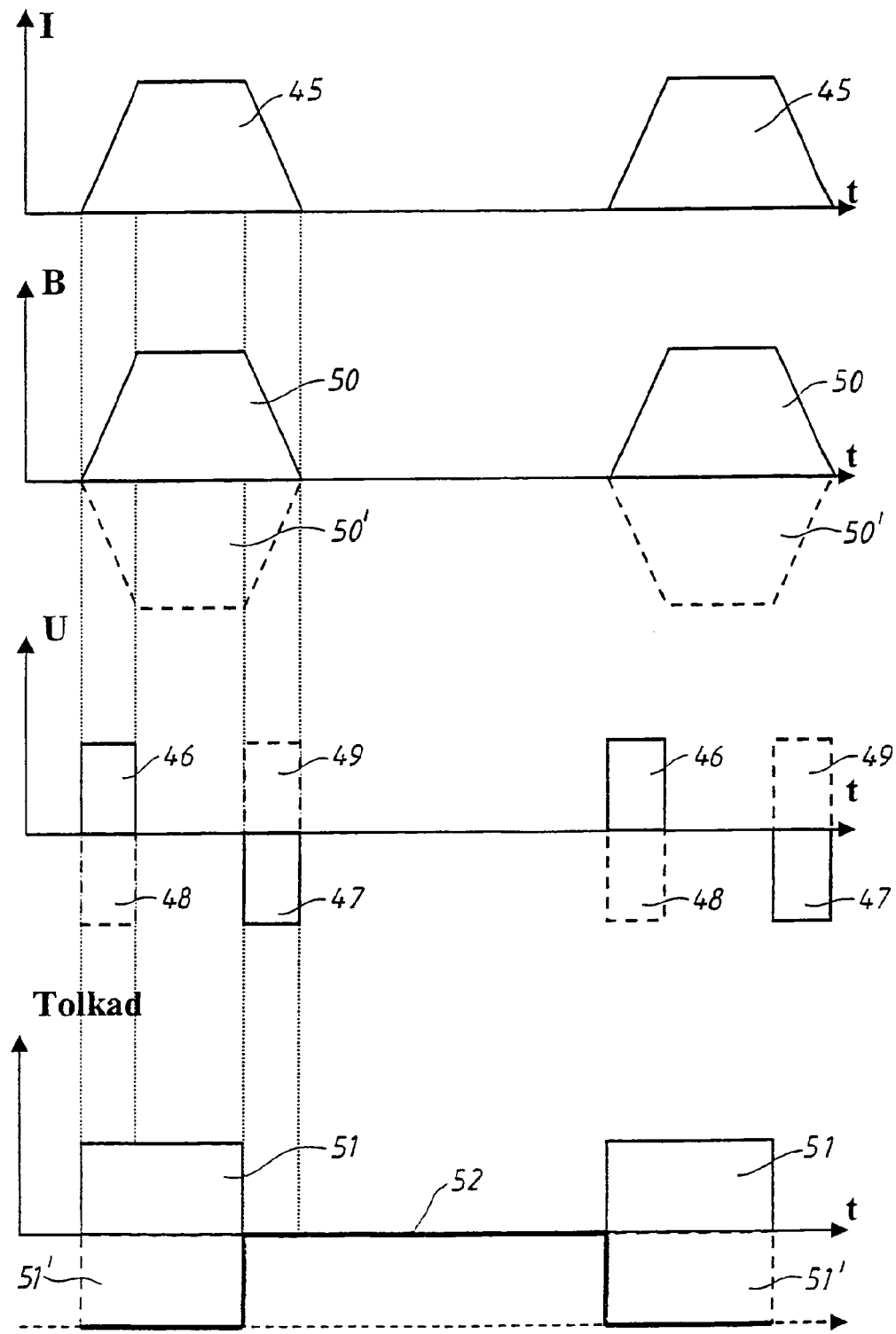
FIG. 10 shows how the sensing system determines an current pulse.

The front and rear edges of the current pulse 20,22,24,26 have the largest derivative (slope) and will cause a voltage in the coil of the receiving unit 11 with a distinct voltage pulse at the front edge of the current pulse and a similar distinct voltage pulse with an opposite polarity at the rear edge of the current pulse. When sensing for A0 (the main current pulse) the control unit will detect the distinct voltage pulses generated at the coil, which corresponds to the edges (flanks) of the current pulse. In FIG. 10 this is further illustrated.

This means that the control unit 12 can determine how long a characteristic current pulse is and how long the state of rest between two current pulses is. This is achieved since the control unit from an occurring positive voltage pulse determines that a current pulse starts alternatively ends and from an occurring negative (opposite) voltage pulse correspondingly determines that a current pulse instead ends or alternatively starts. How this is achieved will be described later on. Features which will make the control unit invert or amplify the signals received by the receiver 11 in order to improve its determination capacity are considered to fall within the scope of the invention. The invention in its broadest embodiment comprises a control unit 12 which can detect the voltage pulses and thereby get a picture of the received magnetic field, which corresponds to the combination of current pulses and states of rest for a current signal transmitted in a cable 1,4,5,6.

The control unit 12 initiates the algorithm (see FIG. 6) by enabling for the detection of the flanks of the current pulses transmitted by the signal generators 3,7,8, which flanks carries information about the magnetic pulses. The reason is to start detecting the appearance of mains pulses A0.

When the voltage pulses of the magnetic pulses 20,22,24, 26 have been received, the sensing system 11,12,13 defines the distance in time between a positive voltage pulse and an after-coming negative voltage pulse or vice verse. Since the sensing system at this point of time only detects 100 μs current pulses, the control unit 12 is enabled to synchronize with the signals from the signal generators. For safety causes, the sensing system starts detecting 30 μs 29 before the point of time when the front flank of the pulse A0 should occur, see the lower diagram in FIG. 2. When the control unit has realised that the pulse occurring is an A0 pulse, and when the unit before this has detected another A0 pulse, the unit will adjust its period based on the information from the pulse flanks.

FIG. 7 shows how the control unit 12 synchronizes the sensing system 11,12,13 which synchronization corresponds to the cooperation between the robot 2 and the signal generators 3,7,8. The control unit continuously detects A0 pulses and adjusts its period based on this information. Since the control unit only detects pulses during certain time intervals, for instance in the window 28,29 of FIG. 2, it is important that the period for the sensing system corresponds with the period for the signal generators. In order to avoid that a disturbing noise A0 pulse from an external source should disturb the search system, the adjustment of the period for the sensing system is made step by step.

One lonely A0 pulse within the time interval of 30 μs defined by 28 and 29 in FIG. 2 should not be able by its own to actuate the synchronization of the sensing system, since this pulse may be a noise signal from an external system. Therefore the period for the sensing system 11,12,13 is adjusted based on a part of the divergence between the present period calculated by the sensing system and the actual period defined by the A0 pulses transmitted by the signal generators. Therefore, several "true" A0 have to be detected before the period of the sensing system is finally adjusted. The risk of several disturbing noise pulses occurring after each other is considered as very low. For safety causes the algorithm will be activated only if the counted accepted pulses goes down. The reason is to avoid that the sensing system continuously operates at the wrong period.

It is important that the period for the sensing system 11,12, 13 is right. This is a necessary condition in order for the signal generators and electrical cable to be able to communicate with the robot. If the period is wrong the detecting window will continuously be dislocated and the sensing system will detect at the wrong time. Thereby, the control unit will not be able to detect any magnetic pulses from the electrical cable.

What is the purpose with this communication between the electrical cable 1,4,5,6 and the robot, and why is it so important that this works? The main purpose is to control the movements of the robot in relation to a surface. This means that in the illustrative embodiment, the robot should be able to stay within an area surrounded by the outer electrical cable 1 and/or areas surrounded by the electrical cables 4,5,6. In the preferred embodiment, the signal generator 3 transmits the pulses A0 through cable 1. The sensing system 11, 12, 13 of the robot detects A0 and adjusts its period based on the information carried by A0 (see FIG. 6-7). The fact that A0 exists is therefore necessary in order for the communication.

Since the robot 2 can detect the field intensity of A0, it will know when it approaches the cable 1. When the receiver 11 has crossed the cable 1 the magnet field which the sensing system 11,12,13 detects will switch to the opposite direction, see FIG. 5. The control unit 12 will thereby instead detect a negative voltage pulse when a current pulse starts and a positive voltage pulse when a current pulse ends. The characters chosen, positive and negative, on each side of the cable is only intended to illustrate the opposite directions of the magnet field. It is very much possible that the voltage pulses generated have an opposite direction, meaning a positive voltage pulse when a current pulse starts and a negative positive voltage pulse when a current pulse ends.

In FIG. 10 the situation is clearer illustrated, In the upper diagram two current pulses 45 (no push-pull shown) are shown. These pulses have leaning sides (flanks) which is caused by and illustrates the inductance in the cable. This means that the cable is "current slow". When the robot 2 moves and crosses a cable the sensing system 11,12,13 will detect this as if the magnetic field generated by the current pulses switches direction. The pulses 50 illustrated the field direction detected by the sensing system when the system is on one side of the cable and the pulses 50' illustrates the detected field direction when the system is on the other side of said cable. The magnet field is indicated as B (measured in Tessla) and the magnet field pulses 50/50' has the same appearance as the current pulses 45.

In the next diagram below, the voltage in the receiver coil is illustrated. The voltage is illustrated simplified as the voltage pulses 46-49 in the diagram. U represents the voltage level. The induced voltage pulse depends on the time derivate of the magnet field, which was described earlier, and has in reality a more complicated appearance. The solid-drawn line voltage pulses 46-47 are induced by the magnet field pulses 50. The pulses 46 are induced when the magnetic field pulse starts at the beginning of the positive leaning flank of the pulse, and the pulses 47 are induced when the magnetic field pulse ends at the beginning of the negative leaning flank of the pulse. The broken line voltage pulses 48-49 are induced by the magnetic field pulses 50'. The pulses 48 are induced when the magnetic field pulse starts at the beginning of the negative (negative since the pulse is negative) leaning flank of the pulse, and the pulses 49 are induced when the magnetic field pulse ends at the beginning of the positive leaning flank of the pulse (positive since the pulse is negative). This means that the voltage pulses switches direction when the signal system crosses the cable.

In the lowest diagram in FIG. 10, it is illustrated how the sensing system 11,12,13 generates (defined as "T" in the diagram) a signal based on the occurrence of the voltage pulses 46-49. The width of the pulses 51/51' gives a simplified picture of the situation. The width of the pulses 51/51' illustrates the detected time period: between the point of time when a current pulse starts and the point of time when it ends. This means that the sensing system knows the width of a current pulse and the width of the time period during which no pulse occurs. The pulse 51' illustrates the fact that the sensing system detects that the current pulse switches direction when the system crosses the cable.

In the diagram this is illustrated by the fact that the pulse can be found below the solid-drawn time axis "t". If the time axis is lowered, corresponds to the broken line axis, so that the lowest side of the pulse 51' touches the time axis, the sensing system will instead understand the absence of pulse 51/51', as a pulse. See the solid-drawn line 52. It is possible theoretically to illustrate how the sensing system 11,12,13 can detect the information brought by the voltage pulses. Lowering or raising the time axis is only a definition of where the reference is defined and does not change the fact how the sensing system detects the situation that has arisen.

The characteristics, as being detected by the sensing system, of the current pulses will therefore vary and depend on which side of a cable 1,4,5,6 the receiver 11 is positioned. This means that the sensing system when it crosses a cable will detect that the pulse ratio between time periods when a pulse occurs and time periods with a state of rest will change. This change in ratio can be used by the sensing system 11,12, 13 in order to come to the conclusion on which side of the cable it is positioned. The sensing system will then, based on the signal defined as "T" in FIG. 10, generate further signals which in the end is transmitted to the motor unit 13 in order to operate the robot in a certain way.

Knowing about this the control unit 12 could operate using an algorithm that enables for the robot to stay within area surrounded by the outer electrical cable 1. The unit will, if the robot moves out of an area, in such cases control the movements of the robot so that it moves back into the area inside which it is intended to operate. Such a movement is shown as 30 in FIG. 8. One alternative algorithm could enable for the robot to show a movement according to 31 in FIG. 8, which means that the robot moves along an electrical cable. The zick-zack movement is in reality very limited. Using sensitive components and a good algorithm reduces the zick-zack behaviour when the robot follows the cable.

The invention, as shown in the illustrative embodiment, operates with 100 μs and 50 μs current pulses and a period of 12 ms. Another way of defining this is an asymmetric duty cycle. Duty cycle then refers to the division between current pulses as states of rest during a period of 12 ms. This division or ratio could be expressed as a quota or a percent. An asymmetric duty cycle means that the ratio between time periods with current pulses and time periods with states of rest over one 12 ms period differs from 50% or 1/1. An asymmetric duty cycle means that the division between If only one 100 μs pulse occurs during a 12 ms period the division will be 1/120 or 0.8%.

As mentioned earlier, the person skilled in the art will realize that the present invention as disclosed in the present application also comprises cases where the division can differ from the one shown. Since the illustrative embodiment comprises a signal with an asymmetric duty cycle, the control unit 12 will determine a clear change in ratio when the robot passes across a cable 1,4,5,6. The control unit will determine that the ratio changes from 1/120 to 120/1 or correspondingly from 0.8% to 99.2%. The changed division obviously indicates that a cable has been passed. This information may be used by the control unit 12 in order to navigate the robot in relation to a cable.

The signals S1-S3 22,24,26 in FIG. 2 have been mentioned earlier in the application. They have a width of 50 μs not to be confused with the 100 μs A0 that the sensing system uses to synchronize with the signal generators. The 50 μs pulses have the same period 21 and are synchronized in relation with A0, and if the sensing system detects their appearance (the detecting can be adapted for the number of electrical cables used) it can open detection windows 28 in order to receive these. The pulses S1-S3 are not used when synchronizing the sensing system in relation to the signal generators. Therefore, the only information necessary from these are the direction of the detected magnetic field and its intensity. One first purpose with these 50 μs pulses is to enable for the robot to move and navigate in relation to other electrical cables 4, 5, 6 than the outer cable 1.

Figure 8:
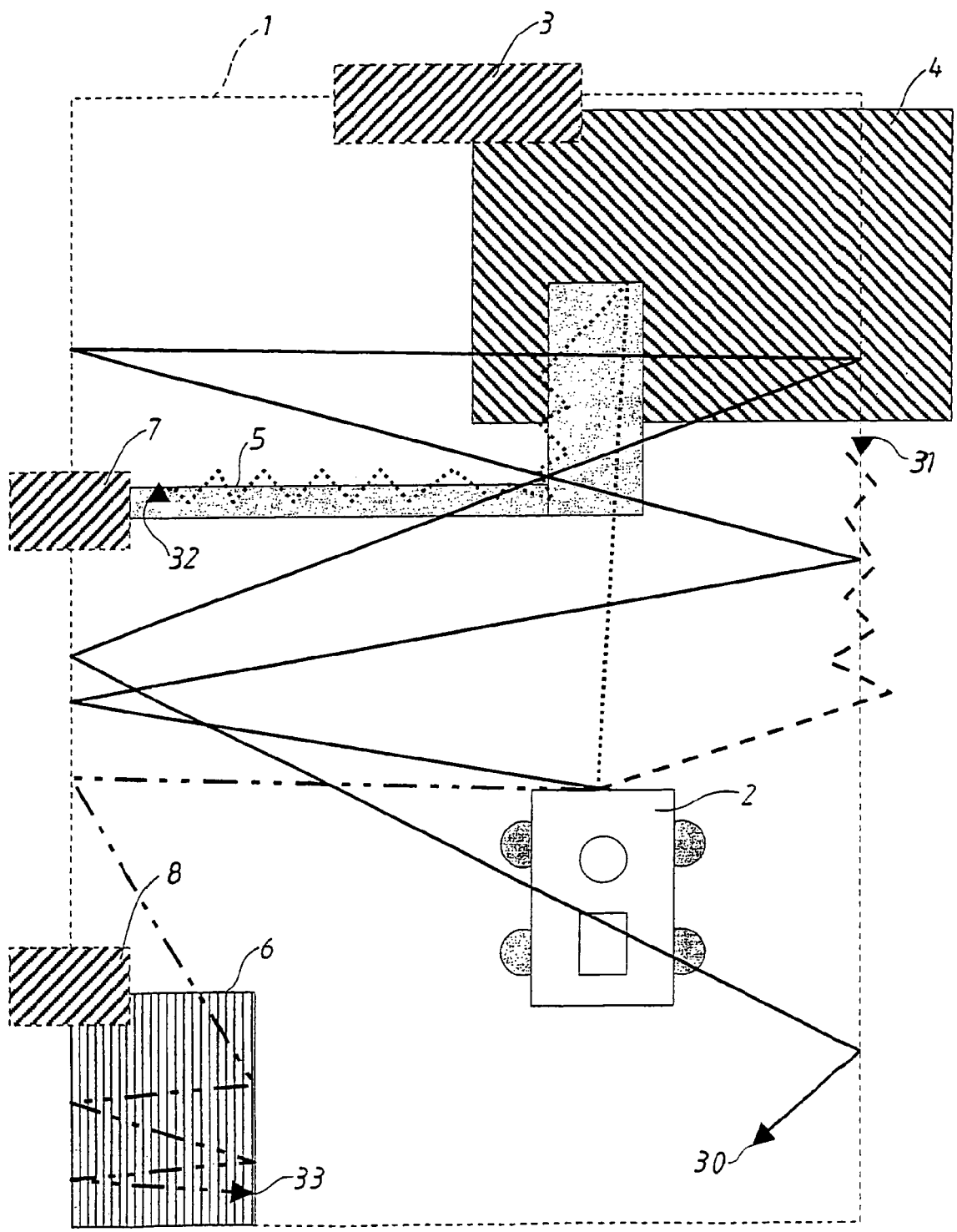
FIG. 8 shows different movement paths for the automatic device in the search system according to FIG. 1.

In FIG. 8 this for instance means that an algorithm working with S2, transmitted through cable 5, will operate the robot to navigate in a certain motion represented by 32. The algorithm will mace sure that the robot follows the cable in a certain direction. The algorithm can for instance be used if the signal generator 7 is also equipped with a charge station for the batteries of the robot. The robot would, using another algorithm, listen for S3 and move within an area surrounded by the cable 6, see movement path 33. This could be useful if a certain area requires higher intensity of treatment, for instance cutting if it refers to an automatic lawnmower.

In order to enable for the sensing system to decide which algorithm it should use when it detects signals, more pulse signals could be used. Since the period for the search system is 12 ms and the time interval for one pulse is only 50-100 μs, there is plenty of room left for more pulses. Using another signal, for instance S1, enables for the search system to send messages between the robot and the signal generators. The sensing system will listen for S1 and each S1 pulse then represent a digital number 1 or 0. Using a group of eight after each other appearing periods in order to transmit a coded S1 message will enable for the generator to activate a certain algorithm on the robot. If another electrical cable is connected to the system later on more space in the period can be used to transmit further messages from the signal generator using this cable. One example of such a communication is when the sensing system 11,12,13, confirms that the signal generator actually transmits pulses. This guarantees that a power cut off to the signal generator will not cause any problems.

Other options could be to allow the robot to transmit signals back to the signal generators. By doing this, a two-way communication is enabled which can be used for various reasons Possible uses for this kind of robot according to the illustrative embodiment is for treating robots, such as robotic vacuum cleaners or robotic lawnmowers. Such robots contain treatment tools such as knives or brushes. In such applications it is possible to allow the control unit 12 to operate those tools based on information transmitted by the signal generators. For instance, the knives may be shut off at certain occasions or movements. Other kind of robots using the present invention could be cleaning robots for wet cleaning of larger floor areas, for instance in industrial environments. The kind of robot in which the search system is used is not that essential, meaning that the application concerns the search system.

The illustrative embodiment relates to a search system with four electrical cables, three signal generators and one robot. The task of the illustrative embodiment is to explain the scope of the invention. The embodiment should therefore be understood as a limitation of the invention. Within the scope of the invention also lies the possibility of adapting another number of cables and/or signal generators, and maybe also use more than one robot. Further embodiments is considered to be enclosed by the scope of the invention as defined according to claim 1. The invention is therefore not limited to the above mentioned and in the figures illustrated embodiment; It can instead be used in any area within which a search system for automatic apparatus on wheels such as a robot may be used.

The invention claimed is:

1. Method for operating an automatic device (2) by means of an electronic directing system, said system comprising at least one first electrical cable (1,4,5,6) connected to at least one first signal generator (3,7,8) and at least one sensing system (11,12,13) arranged on said device (2), said sensing system (11,12,13) detecting at least one magnetic field being transmitted via said cable (1,4,5,6) and propagating through the air, the sensing system transmitting a processed signal to at least one driving means which contributes to the movements of said device in relation to a surface, characterized in that said first signal generator (3,7,8) transmits a current through said first cable (1,4,5,6), said current during a part of time is in a state of rest were it is substantially constant, said state of rest periodically being interrupted by at least one first characteristic current pulse (20) and that said sensing system (11,12,13) synchronizes the time intervals (28,29) within which the system (11,12,13) detects magnetic fields based on the properties of said first current pulse (20), said first current pulse being transmitted through an electrical cable (1) that substantially demarcates the area within which the automatic device (2) intends to operate.

2. Method according to claim 1, characterized in that said sensing system (11,12,13) adapts the time intervals (28,29) within which the system (11,12,13) detects magnetic fields based on the properties of said first current pulse (20).

3. Method according to claim 2 characterized in that said adaptation refers to the synchronization of frequency at which said sensing system (11,12,13) operates, which is being made by said system (11,12,13) based on said first current pulse (20).

4. Method according to claim 2, characterized in that said adaptation refers to the synchronization of said time intervals (28,29), which is being made by said sensing system (11,12,13), is based on the periodicity, time occurrence and/or the durability of said first current pulse (20).

5. Method according to claim 2, characterized in that said time intervals (28,29) are being adapted so that the sensing system (11,12,13) is able to detect the presence of current pulses (20,22,24,26) transmitted from said directing system, said sensing system (11,12,13) during the await of the next pulse (20,22,24,26) to appear disregards pulses occurring outside said time intervals (28,29).

6. Method according to claim 1, characterized in that the current in each of said electrical cables (1,4,5,6) is being transmitted by one of said signal generators (3,7,8), said generator (3,7,8) synchronizing each current pulse (20,22,24,26) it transmits with other current pulses (20,22,24,26) in the search system, in that no current pulses (20,22,24,26) in the search system will occur at the same point of time within the same period (21).

7. Method according to claim 1, characterized in that the current in each of said electrical cables (1,4,5,6) is being transmitted by one of said signal generators (3,7,8), said generator (3,7,8) synchronizing each current pulse (20,22,24, 26) it transmits with other current pulses (20,22,24,26) in the search system, in that the time distance between each current pulse (20,22,24,26) occurring in said search system is large enough so that signals generated in the sensing system (11, 12,13) that originate from a current pulse (20,22,24,26) has partly decayed before generated signals that originate from another current pulse (20,22,24,26) occurs.

8. Method according to claim 1, characterized in said current in more than one electrical cable (1,4,5,6) is transmitted from the same signal generator.

9. Method according to claim 1, characterized in that said current has the same period (21) irrespective of the electrical cable (1,4,5,6) through which it is transmitted.

10. Method according to claim 1, characterized in that the period (21) for the search system is selected by the user of the search system.

11. Method according to claim 1, characterized in that every current pulse (22,24,26) has a by the search system defined time of occurrence adapted to said first current pulse (20).

12. Method according to claim 1, characterized in that a transmitted current pulse (20,22,24,26) in each electrical cable (1,4,5,6) contains a course of events in time where the pulse is positive and negative in relation to said state of rest for the current.

13. Method according to claim 1, characterized in that said first current pulse (20) has a pulse characteristic which differs from the characteristic of other current pulses (22,24,26) in the search system.

14. Method according to claim 1, characterized in that said sensing unit (11,12,13) detects the magnetic field (20,22,24, 26) transmitted from at least one of said electrical cables (1,4,5,6) in the whole area in which the device is intended to operate.

15. Method according to claim 1, characterized in that at least one of said electrical cables (6) is connected directly to one of said other electrical cables (1).

16. Method according to claim 1, characterized in that the sensing unit (11,12,13) only detects the magnetic field transmitted from one of said electrical cables (1,4,5,6) in a part of the area in which the device is intended to operate.

17. Method according to claim 1, characterized in that at least one signal generator (3,7,8) transmits information to the sensing system (11,12,13) through a selective change of the properties of an information current pulse (22,26) from period to period, said information current pulse (22,26) occurring in an electrical cable at a certain point of time in relation to the first current pulse (20).

18. Method according to claim 17 characterized in that said selective change of the properties for the information current pulse (22,26) constitutes in a choppy current direction.

19. Method according to claim 17 characterized in that said selective change of the properties for the information current pulse (22,26) constitutes in selectively inhibited current pulses.

20. Method according to claim 17 characterized in that said selective change of the properties for the information current pulse (22,26) constitutes in current pulses with selectively different pulse width.

21. Method according to claim 17, characterized in that different operations are activated at the device (2) based on said information, said operations for instance being a regulation of the movements of said device (2) across the surface in relation to an electrical cable (1,4,5,6).

22. Method according to claim 1, characterized in that the sensing system (11,12,13) only detects current pulses (20,22, 24,26) if they constitute in magnetic field pulses with one essential field direction.

23. Method according to claim 1, characterized in that the sensing system (11,12,13) detects the positive and negative flank of a current pulse (20,22,24,26), whereby the time distance between these two flanks settles the processing said system makes based on the detected flanks.

24. Method according to claim 1, characterized in that the sensing system (11,12,13) detects said flanks by detecting occurred voltage pulses.

25. Method according to claim 1, characterized in that the sensing system (11,12,13) with knowledge of said occurred voltage pulses (50/50') detects on which side of a cable (1,4,5,6) at least a part of the device (2) is being positioned.

26. Method according to claim 25 characterized in that said detection refers the fact that the sensing unit (11,12,13) detects the magnetic field (50/50') which is being generated from at least one current pulse (45) and based on the properties (50/50') of said magnetic field detects on which side of a cable (1,4,5,6) at least a part of the device (2) is being positioned.

27. Method according to claim 25, characterized in that said detection refers the fact that the sensing unit (11,12,13) detects the magnetic field (50/50') which is being generated from at least one current pulse (45) and based on the relation between at least one via said magnetic field (50/50') detected current pulse (45) and at least one via said magnetic field (50/50') detected state of rest detects on which side of a cable (1,4,5,6) at least a part of the device (2) is being positioned.

28. Method according to claim 25, characterized in that the sensing unit (11,12,13) detects on which side of a cable (1,4,5,6) at least a part of the device (2) is positioned by generating an interpretation signal (T) based on the detected magnetic field, the characteristics of said interpretation signal being dependent on which side of said cable at least a part of the device (2) is being positioned.

29. Method according to claim 28 characterized in that the sensing system (11,12,13) with knowledge of the characteristics of the interpretation signal (T) operates the automatic device (2) in relation to a cable (1,4,5,6).

30. Method according to claim 29 characterized in that said characteristics refers to a pulse ratio corresponding to the time division between those occasions during which a characteristic signal pulse occurs and those occasions during which no such signal pulse occurs.

31. Method according to claim 30 characterized in that said pulse ratio has an asymmetric characteristic.

32. Method according to claim 29, characterized in that the sensing system (11,12,13) based on the detection on which side of a cable (1,4,5,6) at least a part of the device (2) is being positioned operates the automatic device (2) in relation to a cable (1,4,5,6).

33. Method according to claim 29, characterized in that the operation refers to the fact that the device (2) is being manoeuvred to a certain side of a cable (1,4,5,6).

34. Method according to claim 1, characterized in that said current pulse and/or voltage pulse and/or signal pulse refers to a square wave.

35. Method according to claim 1, characterized in that pulse ratio, which corresponds to the time division between those occasions during which a characteristic current pulse occurs and those occasions during which no characteristic current pulse occurs, is asymmetric.

36. Method according to claim 1, characterized in that the sensing unit (11,12,13) through detecting information from current pulses (20,22,24,26) or through detecting information from the user, activates an operation which uses the knowledge said sensing system has about the electrical cable (1,4,5,6) collected by detecting additional information sent by the electrical cable (1,4,5,6).

37. Method according to claim 36 characterized in that said activation of an operation means that the device when approaching an electrical cable (1,4,5,6) substantially follows (31,32) said cable (1,4,5,6) in one of its extension directions.

38. Method according to-claim 36, characterized in that said activation of an operation means that the device when being within an area surrounded by an electrical cable (1,4,5,6) and approaches said cable (1,4,5,6) changes direction and moves (30) inside said area away from said cable (1,4,5,6).

39. Method according to claim 36, characterized in that said activation of an operation means that a user via a control device can control the movements and/or treatment that the device is performing.

40. Method according to-claim 1, characterized in that the sensing system (11,12,13) transmits information.

41. Method according to claim 40 characterized in that said transmitted information is being sent in the time interval between two occurring current pulses (20,22,24,26).

42. Method according to claim 1, wherein the automatic device comprises a treating robot that comprises a treatment system for treating said surface.

43. Electronic directing system operating an automatic device (2), said system comprising at least one first electrical cable (1,4,5,6) connected to at least one first signal generator (3,7,8) and at least one sensing system (11,12,13) arranged on said device, said sensing system (11,12,13) detecting at least one magnetic field being transmitted via said cable (1,4,5,6) and propagating through the air, the sensing system transmitting a processed signal to at least one driving means which contributes to the movements of said device in relation to a surface, characterized in that said system comprises means by which said first signal generator (3,7,8) transmits a current through said first cable (1,4,5,6), said current during a part of time being in a state of rest were it is substantially constant, said state periodically being interrupted by at least one first characteristic current pulse (20) and that said sensing system (11,12,13) synchronize the time intervals (28,29) within which the system (11,12,13) detects magnetic fields based on the properties of said first current pulse (20), said first current pulse being transmitted through an electrical cable (1) that substantially demarcates the area within which the automatic device (2) intends to operate.

44. Electronic directing system according to claim 43 characterized in that said current has the same period (21) irrespective of the electrical cable (1,4,5,6) through which it is transmitted.

45. Electronic directing system according claim 43, characterized in that every current pulse (22,24,26) has a by the search system defined time occurrence adapted to said first current pulse (20).

46. Electronic directing system according to-claim 43, characterized in that a transmitted current pulse (20,22,24,26) in each electrical cable (1,4,5,6) contains a course of events in time where the pulse is positive and negative in relation to said state of rest for the current.

47. Electronic directing system according to claim 43, characterized in that said first current pulse (20) has a pulse width which differs from the pulse width of other current pulses (22,24,26) in the search system.

48. Electronic directing system according to claim 43, characterized in that said sensing unit (11,12,13) detects the magnetic field (20,22,24,26) transmitted from at least one of said electrical cables (1,4,5,6) in the whole area in which the device is intended to operate.

49. Electronic directing system according to claim 43, characterized in that at least one of said electrical cables (6) is connected directly to one of said other electrical cables (1).

50. Electronic directing system according to claim 43, characterized in that at least one of the electrical cables (1,4,5,6) is arranged above, within or below the surface which the device (2) is intended to move in relation to, said cable (1,4,5,6) thereby separates an inner area of said surface being surrounded by the cable (1,4,5,6) from an outside area outside said cable (1,4,5,6).

51. Electronic directing system according to claim 43, characterized in that the sensing unit (11,12,13) only detects the magnetic field transmitted from one of said electrical cables (1,4,5,6) in a part of the area in which the device (2) is intended to operate.

52. Electronic directing system according to claim 43, characterized in that an automatic device (2) refers to a treating robot which comprises a treatment system for treating said surface.

53. Electronic directing system according to claim 52 characterized in that the treatment system is operated based on information received and/or stored for treatment operations by the sensing system (11,12,13).

54. Electronic directing system according to claim 52, characterized in that said device relates to an automatic lawnmower, whereby said treatment system constitutes in knives cutting the plants growing on said surface.

55. Electronic directing system according to claim 52, characterized in that said device relates to an automatic vacuum cleaner, whereby said treatment system relates to parts which a normal automatic vacuum cleaner is equipped with for cleaning said surface, said parts for instance being a brush roller and a suction device.

56. Electronic directing system according to claim 52, characterized in that said device relates to an automatic cleaning robot, whereby said treatment system relates to parts which a normal cleaning robot is equipped with for cleaning a surface, such as tools for wet cleaning.

* * * * *

UNITED STATES PATENT AND TRADEMARK OFFICE
CERTIFICATE OF CORRECTION

PATENT NO. : 7,613,543 B2
APPLICATION NO. : 10/517043
DATED : November 3, 2009
INVENTOR(S) : Petersson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1086 days.

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,613,543 B2
APPLICATION NO. : 10/517043
DATED : November 3, 2009
INVENTOR(S) : Ulf Petersson et al.

Page 1 of 1

It is certified that error appears in the above-identified patent and that said Letters Patent is hereby corrected as shown below:

Column 7, line 29, please delete "corning" and insert --coming--;
Column 10, line 22, please delete "mace" and insert --make--;
Column 11, line 7, please delete "embodiment;" and insert --embodiment.--;

Signed and Sealed this
Twenty-second Day of February, 2011

David J. Kappos
*Director of the United States Patent and Trademark Office*